United States Patent
Lofgren

(10) Patent No.: US 8,528,330 B2
(45) Date of Patent: Sep. 10, 2013

(54) ENHANCED SUPERCHARGING SYSTEM AND AN INTERNAL COMBUSTION ENGINE HAVING SUCH A SYSTEM

(75) Inventor: Isak Lofgren, Vastra Frolunda (SE)

(73) Assignee: KASI Technologies AB, Saro (SE)

( * ) Notice: Subject to any disclaimer, the term of this patent is extended or adjusted under 35 U.S.C. 154(b) by 110 days.

(21) Appl. No.: 13/025,804

(22) Filed: Feb. 11, 2011

(65) Prior Publication Data

US 2011/0138808 A1 Jun. 16, 2011

Related U.S. Application Data

(63) Continuation of application No. 12/670,226, filed as application No. PCT/SE2008/050883 on Jul. 22, 2008, which is a continuation of application No. 11/781,992, filed on Jul. 24, 2007, now Pat. No. 7,765,805.

(51) Int. Cl.
| | | |
|---|---|---|
| F02B 33/44 | (2006.01) | |
| F02B 33/00 | (2006.01) | |
| F02B 37/10 | (2006.01) | |
| F02B 39/10 | (2006.01) | |
| F02B 39/12 | (2006.01) | |
| F02B 39/06 | (2006.01) | |

(52) U.S. Cl.
USPC ............ 60/608; 60/609; 123/559.3; 123/561; 123/559.1

(58) Field of Classification Search
USPC .................. 60/606–609; 123/559.1–559.3, 123/561; 477/115, 3; 475/3, 5, 275, 207, 475/183

IPC .................... F02B 39/10,39/12, 39/06
See application file for complete search history.

(56) References Cited

U.S. PATENT DOCUMENTS

| | | | |
|---|---|---|---|
| 1,752,224 A | 3/1930 | Apple | |
| 2,149,785 A | 3/1939 | Neugebauer | |
| 2,570,101 A | 10/1951 | Couling | |
| 2,583,651 A * | 1/1952 | Horning, Jr. .................. | 60/612 |
| 2,585,029 A | 2/1952 | Nettel | |
| 2,585,968 A | 2/1952 | Schneider | |
| 2,769,303 A | 11/1956 | Lucia et al. | |
| 2,939,343 A | 6/1960 | Berklege | |
| 2,960,825 A | 11/1960 | Sampietro et al. | |

(Continued)

FOREIGN PATENT DOCUMENTS

| | | |
|---|---|---|
| DE | 3602543 A1 | 10/1987 |
| DE | 4140242 A | 6/1992 |

(Continued)

OTHER PUBLICATIONS

US Office Action dated Oct. 17, 2012, from corresponding U.S. Appl. No. 13/025,937.

(Continued)

*Primary Examiner* — Thai Ba Trieu
(74) *Attorney, Agent, or Firm* — Young & Thompson

(57) ABSTRACT

The invention refers to a supercharging system (6) for an internal combustion engine (1) incorporating in combination, a turbine (7), a compressor (8) and an electrical driven system (20) that is connected by any power transmission system (16, 19) to the crankshaft (4) or any other vehicle drive shaft of an internal combustion engine, where the turbine inlet is subjected to exhaust gases, causing the turbine wheel to rotate and thereby via the drive shaft causing mechanical rotating power.

5 Claims, 11 Drawing Sheets

(56) References Cited

U.S. PATENT DOCUMENTS

| | | | |
|---|---|---|---|
| 3,007,302 A | 11/1961 | Vincent | |
| 3,188,479 A | 6/1965 | Palmer et al. | |
| 3,238,713 A * | 3/1966 | Wallace | 60/608 |
| 3,307,426 A | 3/1967 | Whitaker | |
| 3,603,079 A | 9/1971 | Kickbusch | |
| 3,667,214 A | 6/1972 | Addie | |
| 3,673,797 A | 7/1972 | Wilkinson | |
| 3,880,434 A | 4/1975 | Echard et al. | |
| 4,078,387 A | 3/1978 | Melchior et al. | |
| 4,145,888 A * | 3/1979 | Roberts | 60/608 |
| 4,191,070 A | 3/1980 | McKinniss | |
| 4,445,337 A | 5/1984 | McCreary | |
| 4,452,043 A * | 6/1984 | Wallace | 60/600 |
| 4,610,182 A | 9/1986 | Heidrich | |
| 4,719,818 A | 1/1988 | McCreary | |
| 5,033,269 A | 7/1991 | Smith | |
| 5,063,904 A | 11/1991 | Winkelmann et al. | |
| 5,079,913 A | 1/1992 | Kishishita | |
| 5,105,793 A | 4/1992 | Winkelmann et al. | |
| 5,133,188 A * | 7/1992 | Okada | 60/609 |
| 5,133,325 A | 7/1992 | Winkelmann | |
| 5,138,840 A | 8/1992 | Oguchi et al. | |
| 5,172,753 A | 12/1992 | Kadle et al. | |
| 5,605,045 A | 2/1997 | Halimi et al. | |
| 5,729,978 A | 3/1998 | Hiereth et al. | |
| 5,771,695 A | 6/1998 | Halimi | |
| 5,826,673 A | 10/1998 | Bates et al. | |
| 5,887,434 A * | 3/1999 | Arnell et al. | 60/608 |
| 5,890,468 A * | 4/1999 | Ozawa | 123/561 |
| 5,909,075 A * | 6/1999 | Heimark | 474/86 |
| 6,082,340 A * | 7/2000 | Heimark | 123/559.1 |
| 6,516,789 B1 | 2/2003 | Jones | |
| 6,609,505 B2 * | 8/2003 | Janson | 123/559.1 |
| 6,681,574 B2 | 1/2004 | Berglund et al. | |
| 6,739,845 B2 | 5/2004 | Woollenweber | |
| 6,846,258 B2 | 1/2005 | Aoki | |
| 6,994,531 B2 | 2/2006 | Dairokuno et al. | |
| 7,055,507 B2 * | 6/2006 | Kelley, Jr. | 123/559.1 |
| 7,316,628 B2 | 1/2008 | Serkh | |
| 7,524,263 B2 | 4/2009 | Johnson et al. | |
| 7,622,840 B2 | 11/2009 | Yonemori et al. | |
| 7,654,251 B2 | 2/2010 | Jones et al. | |
| 7,703,283 B2 | 4/2010 | Barker | |
| 7,765,805 B2 | 8/2010 | Lofgren | |
| 7,849,840 B2 | 12/2010 | St. James | |
| 8,087,401 B2 * | 1/2012 | Inoue et al. | 123/559.1 |
| 8,101,360 B2 * | 1/2012 | Kornman et al. | 435/6.11 |
| 8,141,360 B1 | 3/2012 | Huber | |
| 8,196,686 B2 | 6/2012 | Grieve | |
| 2003/0145597 A1 | 8/2003 | Kusase | |
| 2006/0008368 A1 | 1/2006 | Czechowski et al. | |
| 2006/0037318 A1 | 2/2006 | Kloft et al. | |
| 2006/0148609 A1 | 7/2006 | Roethler et al. | |
| 2006/0180130 A1 | 8/2006 | St. James | |
| 2006/0264296 A1 * | 11/2006 | Moeller | 475/275 |
| 2007/0149336 A1 | 6/2007 | Sallstrom | |
| 2008/0256950 A1 | 10/2008 | Park | |
| 2009/0019852 A1 | 1/2009 | Inoue et al. | |
| 2009/0048745 A1 | 2/2009 | Wu et al. | |
| 2009/0291803 A1 | 11/2009 | Moeller | |
| 2010/0018203 A1 | 1/2010 | Richards | |
| 2010/0031935 A1 | 2/2010 | VanDyne et al. | |
| 2010/0083655 A1 * | 4/2010 | Frederick et al. | 60/608 |
| 2010/0132358 A1 | 6/2010 | Purdey et al. | |
| 2010/0186725 A1 | 7/2010 | Barker | |
| 2010/0199956 A1 * | 8/2010 | Lofgren | 60/607 |
| 2010/0202875 A1 | 8/2010 | Schlienger et al. | |
| 2010/0263675 A1 | 10/2010 | Grieve | |
| 2011/0095541 A1 * | 4/2011 | Baeuerle | 290/1 A |
| 2011/0126536 A1 | 6/2011 | Lofgren | |
| 2011/0131983 A1 | 6/2011 | Lofgren | |
| 2011/0131984 A1 | 6/2011 | Lofgren | |
| 2011/0138808 A1 | 6/2011 | Lofgren | |
| 2012/0121447 A1 | 5/2012 | Hayashi et al. | |
| 2012/0165151 A1 * | 6/2012 | Sherrill et al. | 475/183 |
| 2013/0017920 A1 * | 1/2013 | Sherrill et al. | 475/183 |

FOREIGN PATENT DOCUMENTS

| | | | |
|---|---|---|---|
| DE | 19529740 A1 * | 2/1997 | |
| DE | 10 2005 003 714 | 8/2006 | |
| DE | 102009052225 A | 5/2011 | |
| EP | 331355 | 9/1989 | |
| EP | 0 420 705 | 4/1991 | |
| EP | 517675 A1 * | 12/1992 | |
| EP | 1070837 A2 | 1/2001 | |
| FR | 838676 A | 3/1939 | |
| GB | 2 263 308 A | 7/1993 | |
| GB | 2 390 871 | 1/2004 | |
| GB | 2395231 A * | 5/2004 | |
| JP | 58030419 A | 2/1983 | |
| JP | 60212622 A | 10/1985 | |
| JP | 62-195420 | 8/1987 | |
| JP | 63109235 A * | 5/1988 | |
| JP | 2000-230427 | 8/2000 | |
| JP | 2003254073 A * | 9/2003 | |
| JP | 2009264177 A * | 11/2009 | |
| JP | 2011196221 A | 10/2011 | |
| JP | 2011202598 A * | 10/2011 | |
| JP | 2012092678 A * | 5/2012 | |
| JP | 2012092708 A * | 5/2012 | |
| JP | 2012092801 A | 5/2012 | |
| KR | 10-2004-0031221 | 4/2004 | |
| WO | 2004/025097 | 3/2004 | |
| WO | 2005124121 A | 12/2005 | |
| WO | 2008/075130 | 6/2008 | |

OTHER PUBLICATIONS

US Office Action, dated Sep. 7, 2012, from corresponding U.S. Appl. No. 13/025,810.

International Search Report dated Dec. 19, 2008, from corresponding PCT application.

US Office Actions, dated Sep. 19 and Oct. 17, 2012, from corresponding U.S. Appl. Nos. 13/025,921 and 13/025,937.

Extended European Search Report, dated Jan. 16, 2013, from corresponding EP application.

US Office Action dated Dec. 26, 2012, from corresponding U.S. Appl. No. 13/025,810.

US Official Action dated Mar. 7, 2013, from corresponding U.S. Appl. No. 12/670,226.

US Official Action dated Mar. 5, 2013, from corresponding U.S. Appl. No. 13/025,937.

* cited by examiner

ENHANCED SUPERCHARGING SYSTEM AND AN INTERNAL COMBUSTION ENGINE HAVING SUCH A SYSTEM

CROSS REFERENCE TO RELATED APPLICATIONS

This application is a continuing application of co-pending application Ser. No, 12/670,226 filed on Jan. 22, 2010, which is the 35 U.S.C. §371 national stage of International PCT/SE 2008/050883 filed on Jul. 22, 2008 , which claims priority to U.S. application Ser. No. 11/781,992 filed on Jul. 24, 2007. The entire contents of each of the above-identified applications are hereby incorporated by reference.

FIELD OF INVENTION

The present invention refers to a new, enhanced supercharging system for an internal combustion engine, and also to an internal combustion engine having such a system.

BACKGROUND OF THE INVENTION

Today there is a strong development going on in automotive industry in order to find systems for decreasing over all fuel consumption. There are many technical areas, which together make up for a good result.

One good way of improving internal combustion engine efficiency is to use some kind of supercharging device to increase intake manifold pressure in order to decrease the internal pumping losses. This in turn leads to decreased fuel consumption. R also makes it possible to downsize the engine without interfering with vehicle performance requirements.

There are several different supercharging devices available but they can all be sorted to one of the following types:
From a vehicle drive shaft, such as for instance a crankshaft,
  mechanical driven superchargers
Exhaust driven turbo superchargers
Electrical motor driven superchargers
In some applications more than one supercharging device may be used at the same engine.

JP published patent application No 2000-230427 refers to an internal combustion engine with a supercharger, which via a clutch adapted to connect and disconnect the engine and the supercharger.

WO 2004/025097 A 1 discloses a method for operating an internal combustion engine having a turbocharger with a separate compressor driven via a belt-drive from the engine crankshaft, said compressor being connected to the net of the turbocharger for increasing the pressure of the intake aft delivered to the turbocharger This means that the losses increase due to additional pressurized conduits between the separate compressor and the turbocharger, and also increased mechanical compressor losses at high motor speeds.

PURPOSE OF THE INVENTION

The purpose of the present invention is to combine all these different propulsion modes into one supercharging device in order to make benefit of the different properties associated with the different propulsion modes The purpose is also to provide a possibility of converting overflow energy from the exhaust gases to electric energy, that can be used to recharge the battery if required The supercharging device according to the invention shall be practically applicable on existing internal combustion engines and it shall be possible to propel the net supercharging device with all defined types of propulsion modes.

BRIEF DESCRIPTION OF THE DRAWINGS

Hereinafter the invention will be further described with reference to schematically shown embodiments.

BRIEF DESCRIPTION OF THE PREFERRED EMBODIMENT

Figure 1:
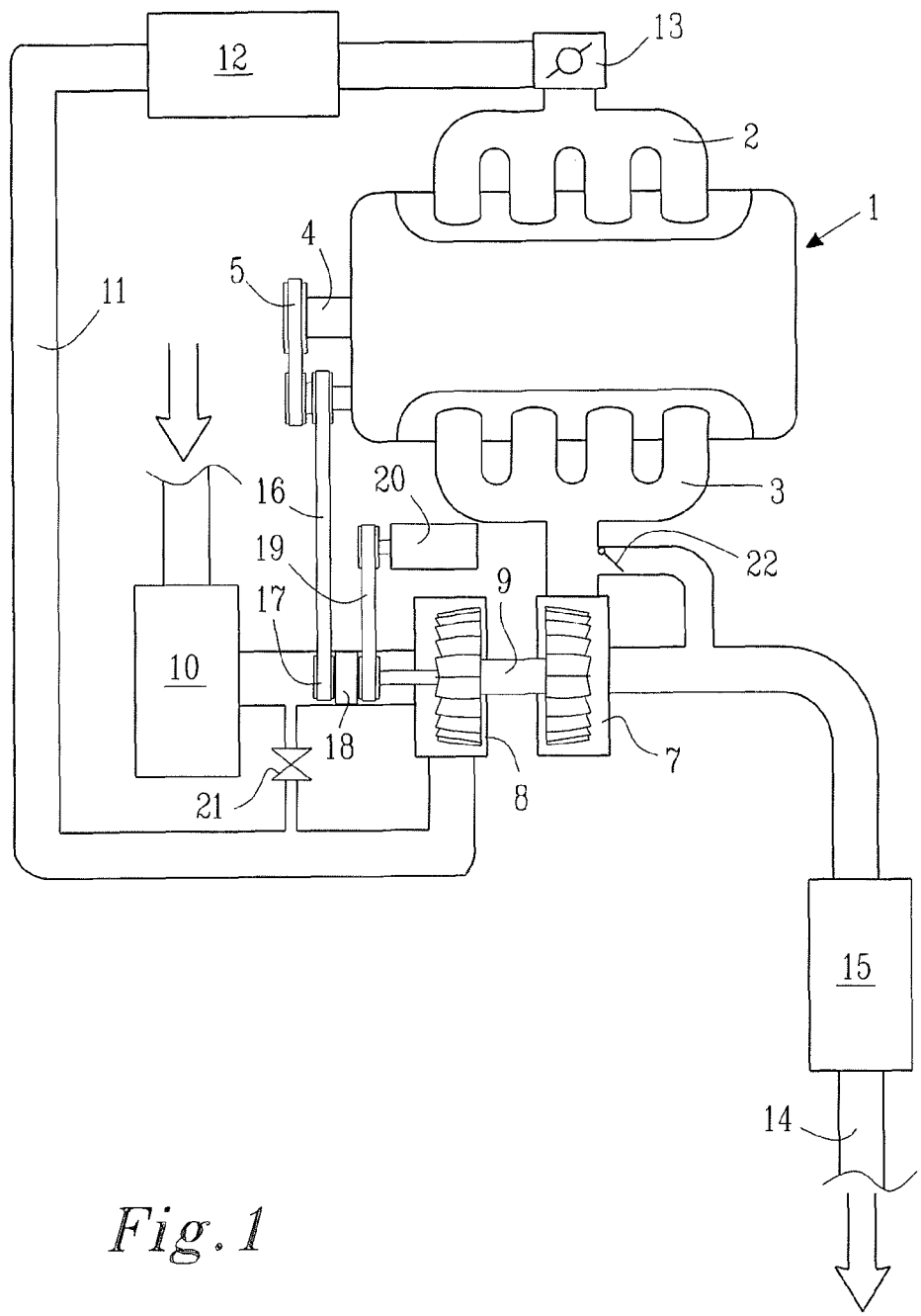
FIG. 1 is a schematical side view of an internal combustion engine equipped with a supercharging system according to the invention.

The proposed solution described in the drawing figures combines a mechanical supercharging system, an electrical supercharging/regenerating system and an exhaust gas propelled turbo supercharging system, which are arranged on a common shaft. This shaft in turn is connected by means of a one way clutch unit to the mechanically propelled shaft, coupled to any engine drive shaft.

FIG. 1 shows schematically an internal combustion engine 1 having an aft intake manifold 2, and an exhaust gas manifold 3. In the embodiment schematically illustrated there are four aft intake pipes intimating that the engine has four cylinders, although the number of cylinders can be higher as well as lower. The engine 1 has a crankshaft 4, which is equipped with a pulley 5.

A supercharging device 6 is attached directly to the engine block in a similar way that turbocharging systems are attached today. This turbocharging device 6 incorporates a turbine 7 and a compressor 8 arranged on a common shaft 9, where the turbine is driven by the exhaust gases from the exhaust gas manifold 3, and the co-rotating compressor impeller 8 is compressing ambient aft which is sucked in via an aft filter 10. The compressed air is in a duct 11 via an intercooler 12 and a throttle 13 introduced in the air intake manifold 2, whereas the exhaust gases after having passed the turbine are evacuated via, an exhaust gas conduit 14 with a catalyzer 15.

The pulley 5 rotating with the crankshaft 4 of the engine, transfers via a belt drive 16 rotation to a shaft 17, which via a one way clutch 18, can be coupled to the shaft 9, on which the turbine 7 and the compressor 8 are arranged, thus that the rotation of the crankshaft 4 can be transferred to the shaft 9 common for the compressor and turbine, in situations where the turbine has not reached its working area.

For regeneration of rotary power to electric, power, the common shaft 9 is connected via a belt drive 19 to an electric machine 20, a battery or the like. The engine also incorporates an engine brake valve 21 and a wastegate 22.

For fitting a supercharging device as described to existing internal combustion engines it is of course necessary to design this device in such a way that it compiles with existing power conversion nodes, i.e. the exhaust gas intake has to be situated for corresponding to the exhaust manifold outlet and the mechanically driven power conversion node has to be located in line with existing outputs for auxiliary loads from the internal combustion engine.

The following technical advantages of the supercharging device as described can be identified, and which mostly arise from the possibility to use each separate sub-system in this concept at its best efficiency interval:

No, or very low mechanical compressor losses at high engine speeds.
Regeneration of energy, to electric power, from the supercharging device, when it has its best efficiency.
The compressor shaft may help the turbine to reach its working area quicker.
One supercharging device, one axis, three different driving modes.
No losses due to additional pressurized pipes between compressor and turbine.
No turbo-lag,
Easy to implement on almost any of today's existing combustion engines.
Possibility to regenerate overflow power from the exhaust gases to electrical power via the electric motor/generator.
Possible to momentary assist the mechanical supercharging system by electrical drive if needed, Le. during very low engine speeds or to maintain boost pressure during fast speed transients.
Gains in terms of engine room space.

Figure 2:
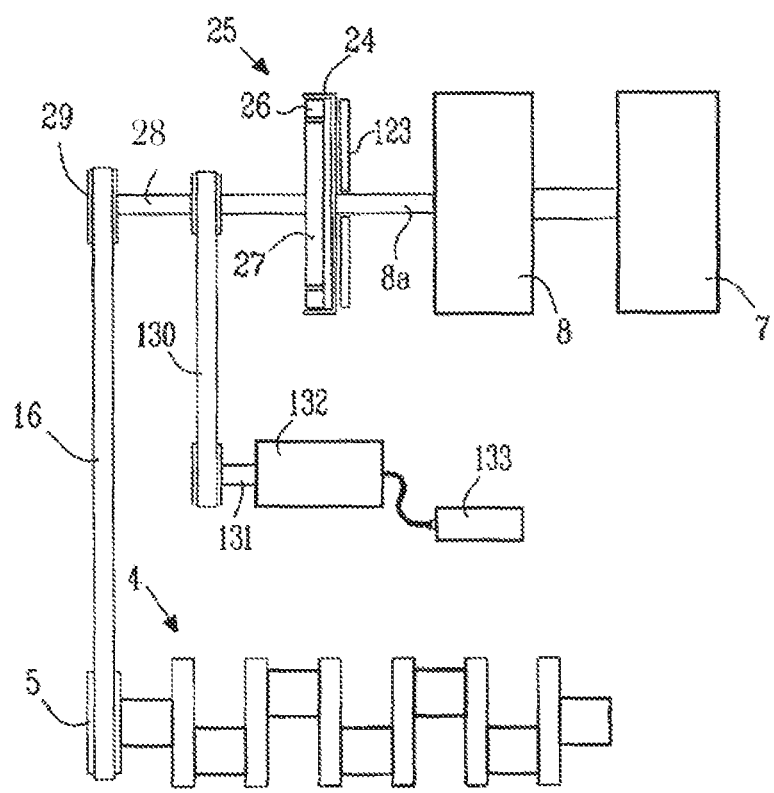
FIG. 2 illustrates schematically in block form a principal lay out for the supercharging system according to the present invention.

FIG. 2 illustrates schematically in block form a principal lay out for the supercharging system according to the present invention, in which is shown a turbine 7 and a compressor 8 arranged on a compressor shaft 8*a* . Via a clutch 123, which for instance can be a one way clutch, this compressor shaft 8*a* can be connected to and disconnected from a ring 24 forming part of a planetary gear 25, having planet wheels 26 connected to a planet wheel carrier and cooperating with a sun wheel 27, which is fitted to a shaft 28 rotatably supported and provided with a pulley 29, which via a transmission, such as a belt drive 16, is connected to a pulley 5 arranged on a drive shaft of the engine, such as the crankshaft 4 thereof, or the like. The planet wheel carrier in turn is via a transmission 130, such as a belt drive, connected to an shaft 131 of an electric motor 132, which is controlled by means of a control electronics device 133.

Figure 3:
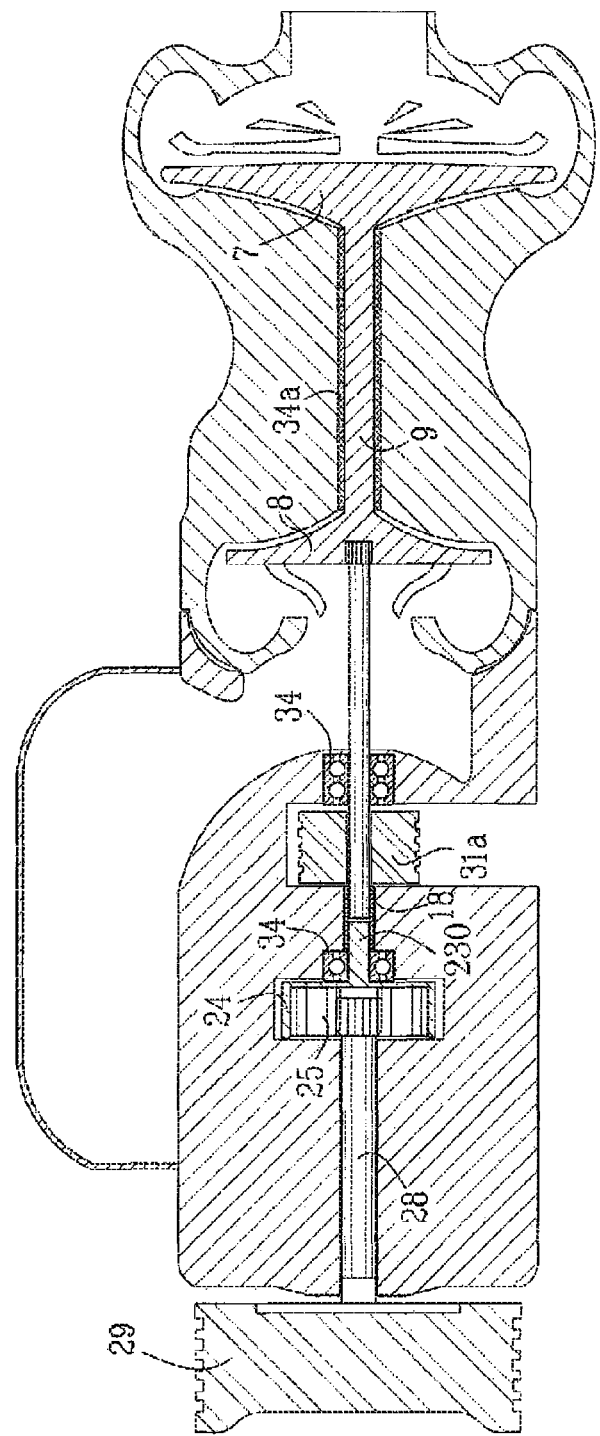
FIG. 3 shows schematically in a side view an embodiment of the supercharging system according to the invention.
Figure 4:
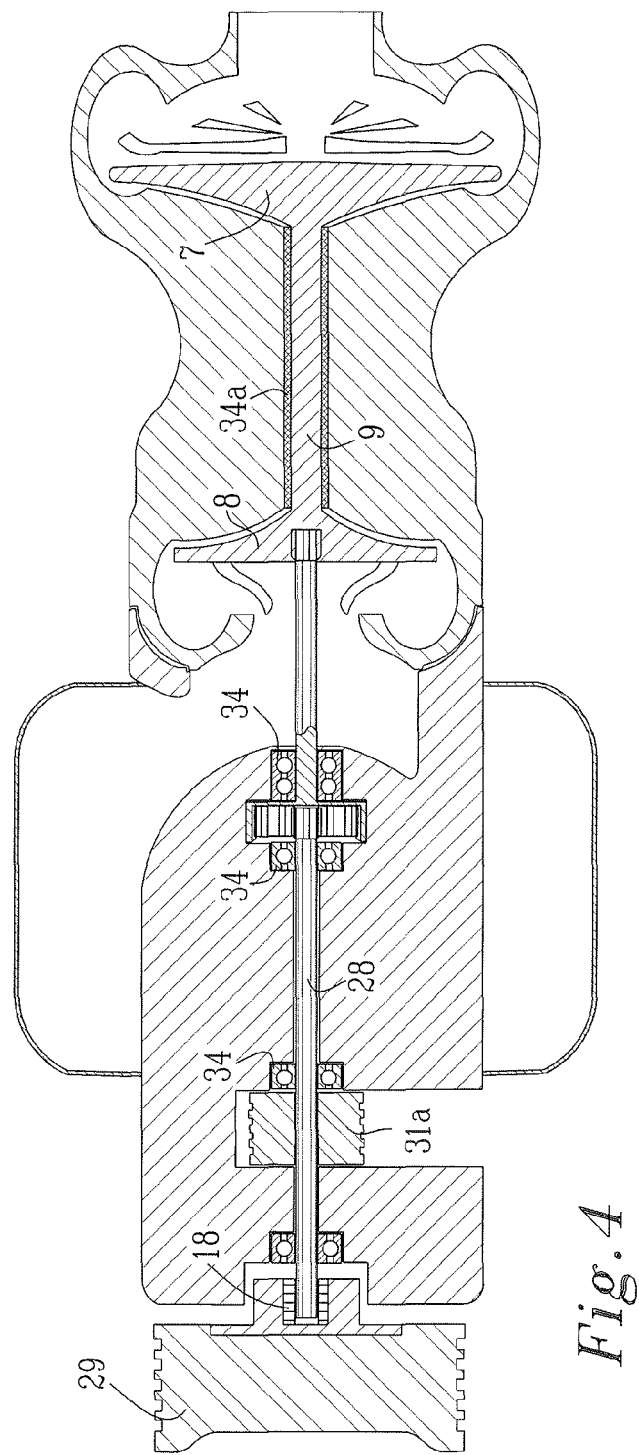
FIG. 4 is a further schematically shown embodiment of the supercharging system, according to the invention.

FIG. 3 and FIG. 4 illustrate schematically two slightly differing embodiments of the supercharging device according to the present invention.

Thus, FIG. 3 illustrates a turbine 7 connected via a shaft 9 to a compressor wheel 8. The shaft 9 is supported in bearings 34, 34*a* , and carries at its end, remote from the turbine 7 a pulley 31*a* , which via a not shown transmission, such as for instance a belt drive is coupled to a not shown generator in order to recover excessive energy from the turbine. In this embodiment of the supercharging device, the shaft 9 can via a clutch 18, 230 be connected to and disconnected from a further shaft 28, whereby the shafts 9, 28 when the clutch is in engaged position interconnects the two shafts as a common axis. This second shaft 28, which is supported in a bearing 34 and is equipped with a planetary gear 25 for changing up the speed. At its opposite side this further shaft 28 carries a further pulley 29, which via a (not shown) transmission, such as a belt drive, is connected to the crankshaft or any other driving shaft of the combustion engine for driving the compressor 8 before the turbine has reached its working speed.

In FIG. 4 is shown another embodiment of a supercharging device which is slightly different from that as shown in FIG. 3.

In this embodiment of a supercharging device according to the invention there is like in FIG. 3 provided a shaft 9 carrying a turbine 7 and a compressor 8, and which shaft is journalled in rolling bearings 34, and plain bearing 34*a* . The shaft 9 is connected to the ring 24 of a planetary gear 25 which has an opposite shaft 28 coupled to the planet wheels of the planetary gear 25. At a short distance from the planetary gear the shaft 28, which forms a continuous axis with the shaft 9, is equipped with a pulley 31*a* , which via a not shown transmission, such as for instance a belt drive is coupled to a not shown generator. After that pulley 31*a* there is provided a further shaft which via a clutch 18 can be connected to and disconnected from the shaft 28, and this further shaft carries a further pulley 29, which via a (not shown) transmission, such as a belt drive, is connected to the crankshaft or any other driving shaft of the combustion engine.

Figure 5:
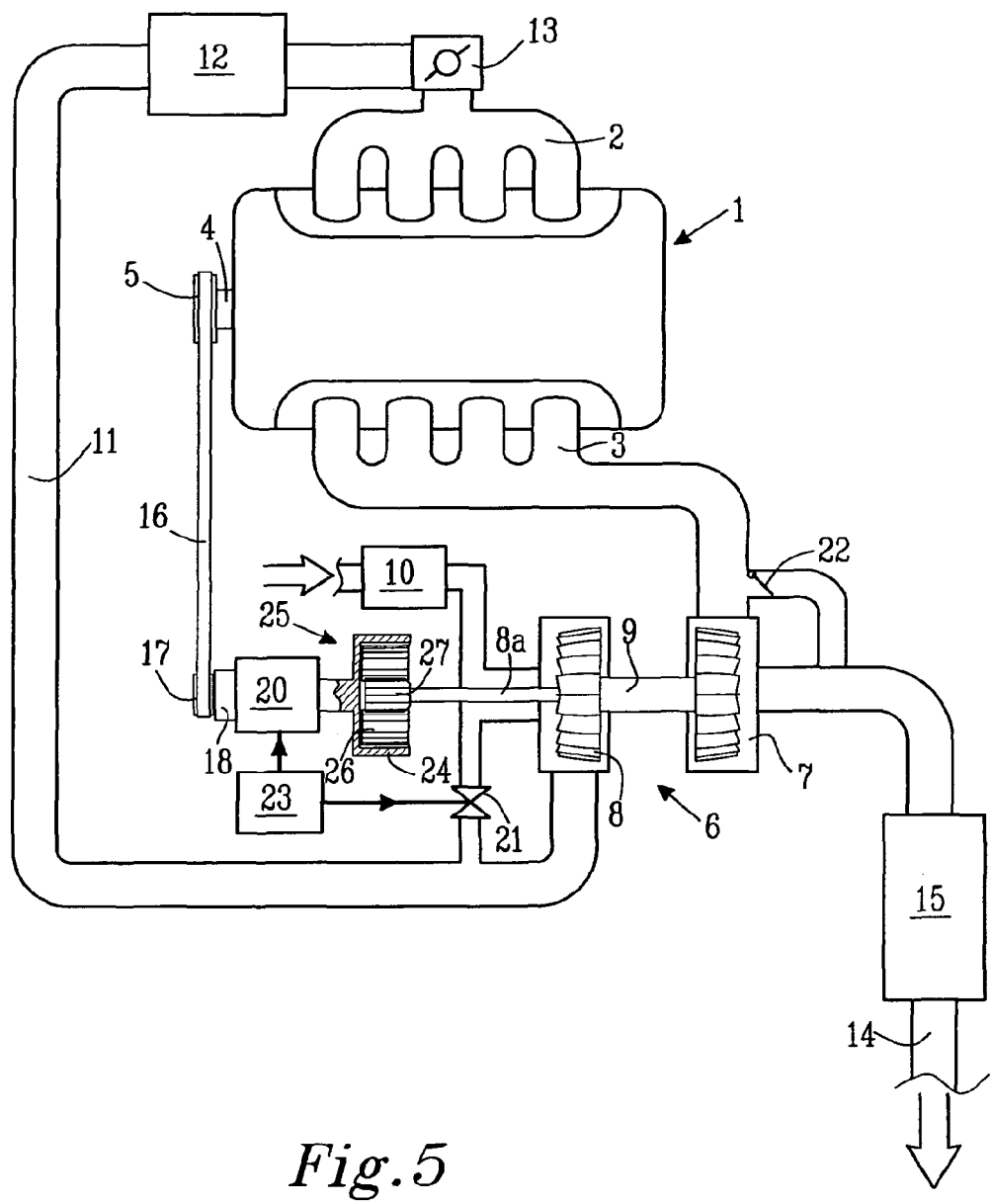
FIG. 5 shows in a view resembling to FIG. 1 a modified embodiment of an internal combustion engine equipped with a supercharging system according to the invention.

FIG. 5 shows schematically an embodiment of an internal combustion engine 1 having an air intake manifold 2 with four air intake pipes, and an exhaust gas manifold 3, having four exhaust gas pipes for the four cylinders of the engine. The engine 1 has a crankshaft 4, which is equipped with a pulley 5.

Attached to the engine block is a supercharging device 6, incorporating a turbine 7 and a compressor 8 arranged on a common shaft 9. The compressor 8 has a compressor shaft 8*a* projecting in the opposite direction to the common turbine/compressor shaft 9. The turbine is driven by exhaust gases from the exhaust gas manifold 3, and the impeller of the co-rotating compressor 8 is compressing ambient air which is sucked in via an air filter 10. The compressed air is in a duct 11 via an intercooler 12 and a throttle 13 introduced in the air intake manifold 2, whereas the exhaust gases after having passed the turbine are evacuated via an exhaust gas conduit 14 with a catalyzer 15.

The pulley 5 rotating with the crankshaft 4 of the engine, transfers via a belt drive 16 rotation to a shaft 17, which via a clutch unit 18, can be coupled to an electric machine 20, which in turn is coupled to a ring gear wheel 24 of a planetary gear 25 with planet gear wheels 26 and a sun gear wheel 27 connected to the compressor shaft 8*a* . In this manner the shaft 9, on which the turbine 7 and the compressor 8 are arranged, thus can transfer the rotation of the crankshaft 4 to the shaft 9, in situations where the turbine has not reached its working area.

The engine also incorporates an engine brake valve 21 and a wastegate 22. The brake valve 21 is controlled by way of a control box 23, which based on different engine behaviour parameters, will operate for maintaining the rotational speed of the turbine so high as possible in order to avoid dangerous pressure increase at the exhaust side.

Figure 6:
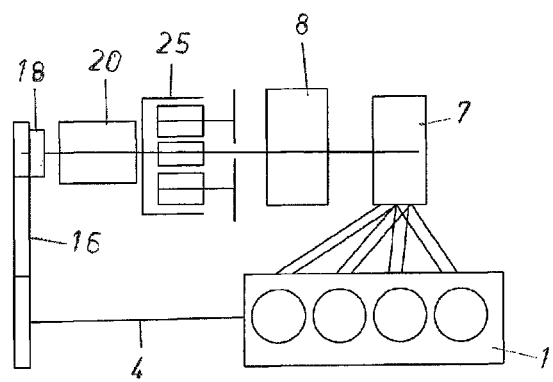
FIGS. 6-16 illustrate schematically further alternative embodiments of the supercharging system according to the invention.

FIGS. 6 to 16 represent alternative versions of the layout of the supercharging device according to the invention shown in schematic form, whereby the schematic representation according to FIG. 6 illustrates the main components of the embodiment according to FIG. 5, i.e. the turbine 7 is driven by the exhaust gases from the engine 1.

The compressor 8 is arranged on the same shaft as the turbine 7, and the engine crank shaft 4 drives via a transmission 16 a pulley which via a freewheel/clutch 18 is connected to a shaft of an electric machine 20 having a working speed of about 20000 rpm or more. Between the electric machine 20 and the compressor shaft 8 is provided a planetary gear 25.

Figure 7:
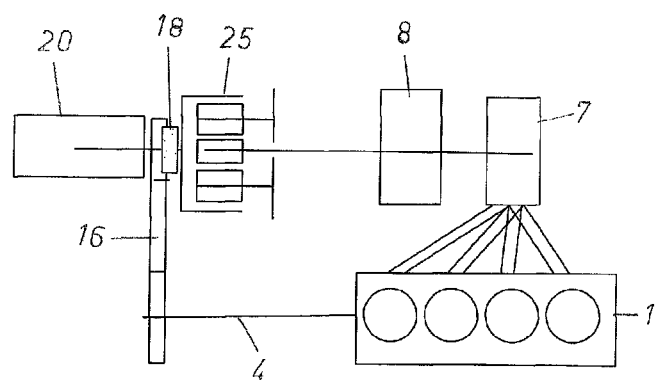

The embodiment illustrated in FIG. 7 differs to that according to FIG. 6 in that the planetary gear 25 is positioned nearest to the clutch 18 and the electric machine 20 is positioned outside the clutch 18.

Figure 8:
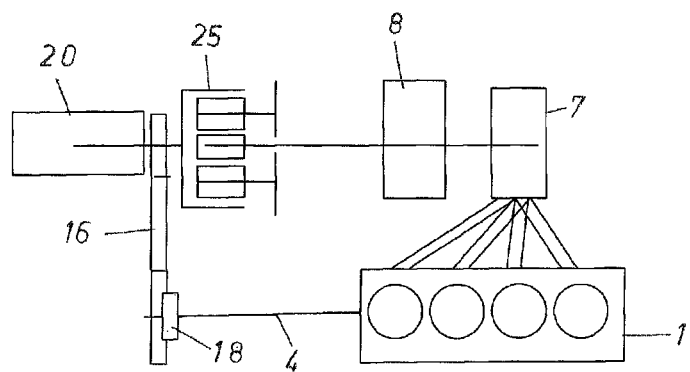

In FIG. 8 is shown an embodiment wherein the clutch 18 is positioned between the crank shaft 4 and the transmission 16, whereas the electric machine 20 is connected to the ring gear wheel of the planetary gear 25.

Figure 9:
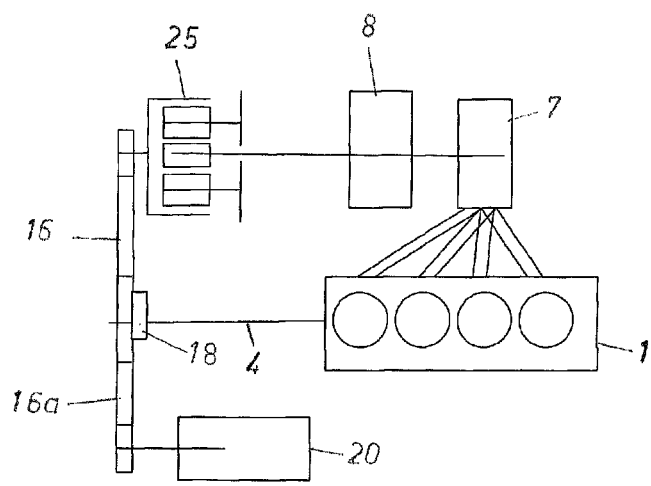

The embodiment shown in FIG. 9 corresponds to the embodiment according to FIG. 7, with the exception that the electric machine is connected to the crank shaft 4, via the clutch 18 and an additional transmission 16a.

Figure 10:
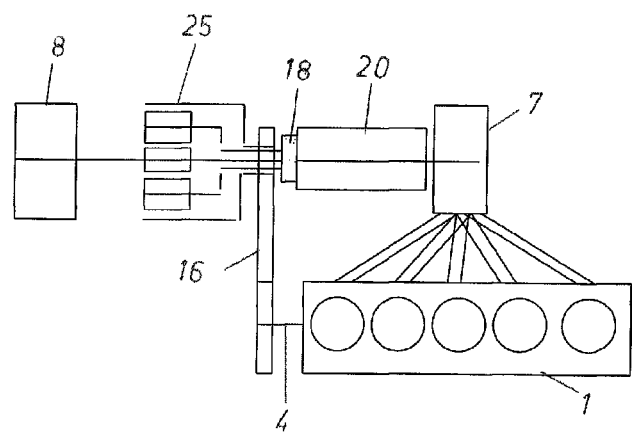

FIG. 10 shows an embodiment where the electric machine 20 is positioned between the turbine 7 and the clutch 18, whereas the planetary gear 25 is positioned between the clutch 18 and the compressor.

Figure 11:
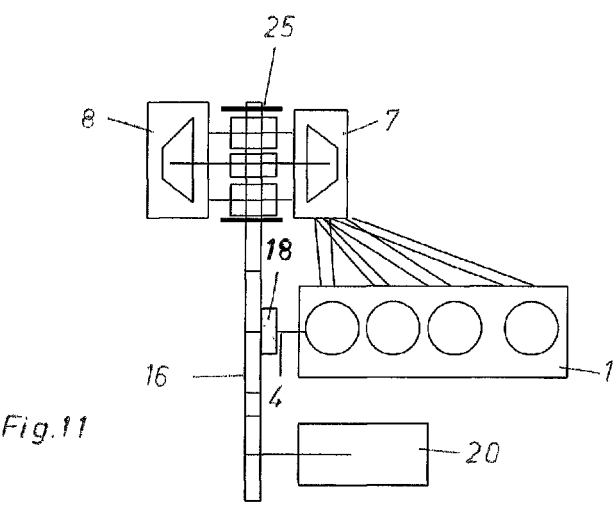

FIG. 11 shows a further alternative embodiment where the turbine 7 and the compressor are interconnected via a planetary gear 25, whereas the clutch 18 is connected between the crank shaft 4 and a transmission 16 driving the electric machine, In this embodiment the planetary gear thus is integral with the turbo chamber housing.

Figure 12:
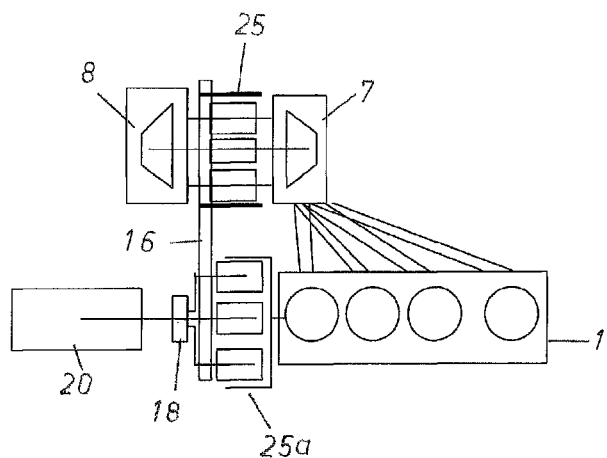

In FIG. 12 is illustrated a mechanical embodiment where a first planetary gear 25 is positioned between the turbine 7 and the compressor 8, whereas a second planetary gear 25a and a clutch 18 are positioned between the engine crank shaft and the electric machine 20.

Figure 13:
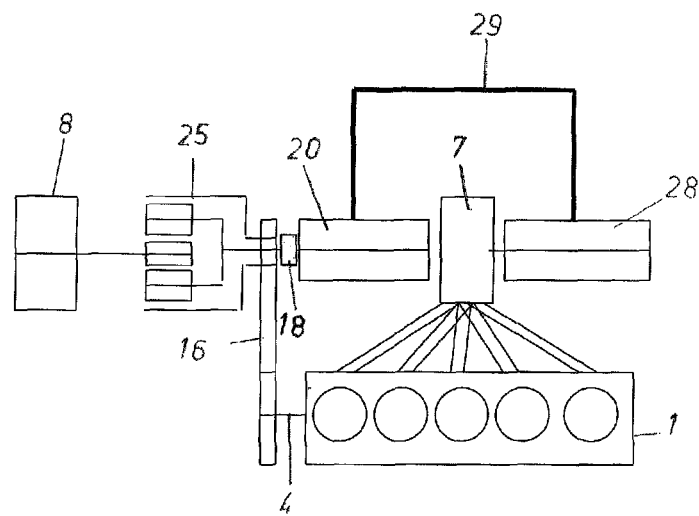

FIG. 13 illustrates an electromechanic solution, where the turbine 7 drives a generator 28, which via a high-voltage connection feeds an electric machine 20. A clutch 18 is provided between the electric machine 20 and a pulley for the transmission 16, and between the pulley and a compressor 8 is provided a planetary gear 25 The rotary speed of the generator 28 is preferably about 100,000 rpm, whereas the electric machine has preferably a rotational speed of about 20,000 rpm.

Figure 14:
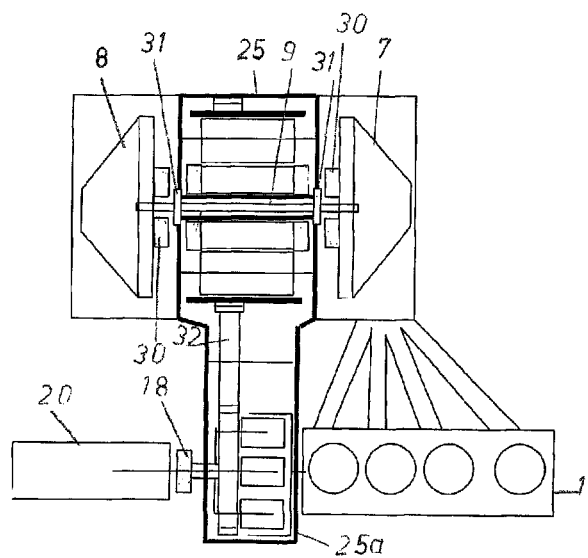

In FIG. 14 is illustrated how the turbo shaft 9 interconnecting the turbine 7 and the compressor 8 is positioned in a dosed housing with the turbo shaft floating in a magnetic field. The solution is equipped with magnetic clutches 30 and gas seals 31. A gear 32 is provided for transferring power from a first planetary gear 25 to a second planetary gear 25a.

Figure 15:
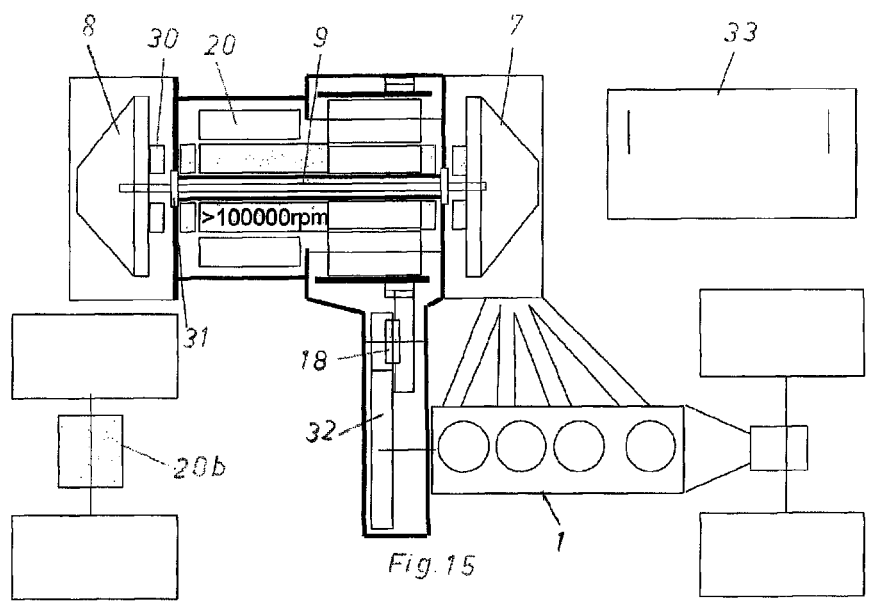

FIG. 15 illustrates a hybrid transmission for high-voltage with a common shaft 9, and a high-speed electric motor connected directly to the turbine shaft and with a high-voltage battery package 33 and a high-speed, high-voltage electric machine 20b.

Figure 16:
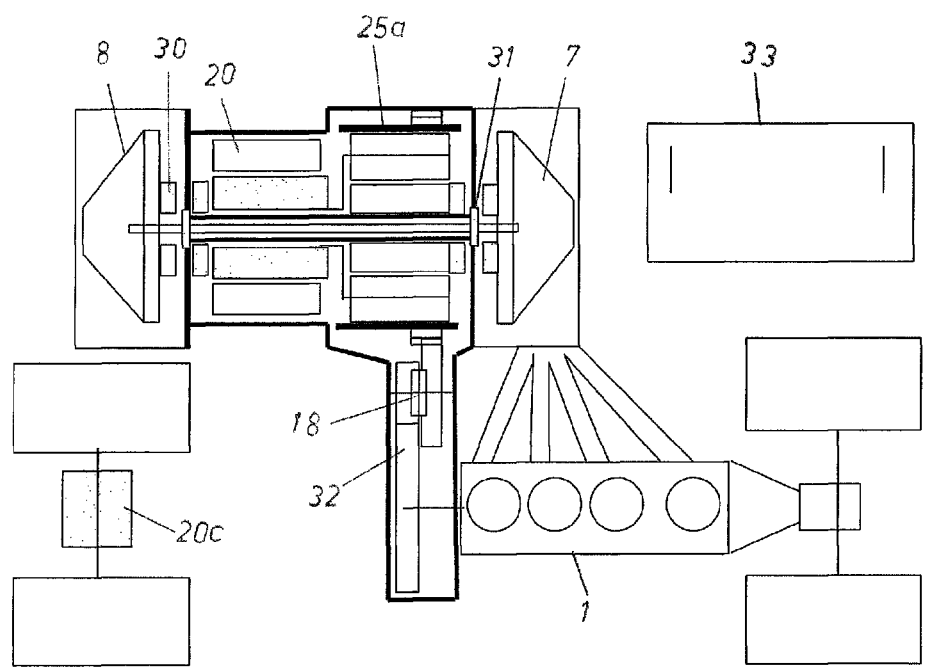

FIG. 16 finally illustrates an embodiment rather like the one according to FIG. 15, but where the electric motor surrounding the turbine shaft is connected to any part of the planetary gear and with a voltage of the battery pack 33 of 600V, and the electric machine 20, 20c has a voltage of 600V.

For easier description of the combined operation of this device the following sub systems are defined.

Turbo Charged System

Turbo charging means good efficiency when activated, but is dependent on high rotational speed for the exhaust gases to have enough power to propel the turbine fast enough to build up substantial intake manifold pressure.

Turbo charging has one major advantage in comparison to all other super charging systems, as it uses overflow energy in the exhaust gases to charge the intake manifold air.

By doing so no extra fuel is consumed in order to build up a good intake manifold pressure. The principle intake manifold pressure as a function of rotational speed has the following appearance:

Super charging means increased intake manifold pressure from low rotational speeds and a proportional increase of intake manifold pressure coupled to the rotational speed. Thus at higher rotational speed the efficiency of the supercharger becomes very poor due to high internal friction and heat losses. The principle intake manifold pressure as a function of rotational speed has the following appearance:

Electrical Super Charged System

Electrical super charged systems work in the same way as mechanically ones but with the advantage that they provide the possibility to control the intake manifold pressure to a given level by providing power when its needed but also to regenerate power from the exhaust gases when possible.

Existing Power Electronics Monitoring Systems

Algorithms for energy management are necessary to be able to regenerate power into the electric system of the vehicle, Systems for this are already developed in many vehicles of today. These systems are designed to keep track on the present auxiliary loads as well as monitoring the battery status. If there is a need for the battery to be recharged and power is available due to the fact that not all auxiliary systems are used, the system may raise the generator load voltage to start recharging the system.

The algorithms can be reconfigured so that it in addition to there present application also regenerates the power provided from this supercharging device into electric power when the battery is not fully charged. By doing so for example during high-way driving the electric system would be better prepared for start-stop applications where a fully charged battery is essential for a good start-stop operation.

In order to decide how and when the electric machine should act new algorithms are needed to support the regenerating mode. By using existing hardware already in production, such as rpm-sensors, pressure and flow sensors together with modifications of existing electric monitoring systems, this could be done.

Power Split and Defined Propulsion Modes

In order to clarify the different propulsion modes of this new invention the following power conversion nodes have been defined:

A: Chemical power (flow, pressure)=>Mechanical power (rotational speed, Torque)

B: Mechanical power (rotational speed, Torque)=>Chemical power (flow, pressure)

C: Generative: Electrical power ($I_1$ U)=>Mechanical power (rotational speed, Torque)

Regenerative: Mechanical power (rotational speed, Torque) =>Electrical power ($I_1$ U).

SUMMARY

This invention provides a relatively easy way of reducing over all fuel consumption by combining already existing systems in a new way. If this invention could be combined on an engine equipped with a start-stop system this would further "boost" this system as well by increasing the amount of times one can start the engine before the electronic monitoring system (CEM) has to step in and shut down the start-stop application to avoid battery depletion.

The invention is not limited to the embodiments schematically illustrated in the drawings and described with reference thereto, but variants and modifications are possible within the scope of the appended claims.

The transmissions described have been illustrated as belt drives, but any type of appropriate transmission units can be used. The clutch units mentioned can be mechanical one way clutches of any appropriate type, although electric clutches, viscous couplings and the like are also possible.

The invention claimed is:

1. A supercharging system for an internal combustion engine, comprising:
   a turbocharging device comprised of a turbine and a compressor;
   said compressor and said turbine arranged on a compressor shaft;
   a first planetary gear carried on said compressor shaft, said first planetary gear comprised of a first sun gear carried by said compressor shaft and a first ring gear;
   a clutch unit;
   a power transmission for connecting a crankshaft of the combustion engine to said first ring gear via the clutch unit, said power transmission comprised of a second planetary gear; said second planetary gear comprised of a second sun gear and a second ring gear; and
   an electric motor/generator connected to said power transmission and said second planetary gear,
      wherein the supercharging system delivers compressed air to the internal combustion engine during engine operation, and
      wherein said second planetary gear, comprised of said second sun gear and said second ring gear, is aligned with said crankshaft.

2. The supercharging system of claim 1, wherein said second planetary gear is configured to provide a power split between said compressor shaft, said electric motor/generator, and said crankshaft.

3. A supercharging system for an internal combustion engine, comprising:
   a turbocharging device comprised of a turbine and a compressor;
   a first planetary gear
   a clutch unit;
   a power transmission for connecting a crankshaft of the combustion engine to power said compressor via the clutch unit; and
   an electric motor/generator, wherein the supercharging system delivers compressed air to the internal combustion engine during engine operation,
   wherein,
      said compressor and said turbine are arranged on a compressor shaft,
      said first planetary gear is carried on said compressor shaft, said first planetary gear comprised of a first sun gear carried by said compressor shaft and a first ring gear,
      said power transmission connecting the crankshaft of the combustion engine to said first ring gear via the clutch unit, said power transmission comprising a second planetary gear,
      said second planetary gear comprised of a second sun gear and a second ring gear,
      said electric motor/generator connected to said power transmission and said second planetary gear, and
      said second planetary gear, comprised of said second sun gear and said second ring gear, is aligned with said crankshaft.

4. A supercharging system for an internal combustion engine, comprising:
   a turbocharging device comprised of a turbine and a compressor;
   a first planetary gear;
   a clutch unit;
   a power transmission for connecting a crankshaft of the combustion engine to power said compressor via the clutch unit; and
   an electric motor/generator, wherein,
      the supercharging system delivers compressed air to the internal combustion engine during engine operation,
      said compressor and said turbine are arranged on a compressor shaft,
      said first planetary gear is carried on said compressor shaft, said first planetary gear comprised of a first sun gear carried by said compressor shaft and a first ring gear,
      said power transmission connecting the crankshaft of the combustion engine to said first ring gear via the clutch unit, said power transmission comprising a second planetary gear,
      said second planetary gear comprised of a second sun gear and a second ring gear; and
      said electric motor/generator connected to said power transmission and said second planetary gear, and
         wherein said second planetary gear is configured to provide a power split between said compressor shaft, said electric motor/generator, and said crankshaft.

5. The supercharging system of claim 4, wherein said second planetary gear, comprised of said second sun gear and said second ring gear, is aligned with said crankshaft.

* * * * *